US009634531B2

(12) United States Patent
Baba et al.

(10) Patent No.: US 9,634,531 B2
(45) Date of Patent: Apr. 25, 2017

(54) ELECTRIC MOTOR WITH EMBEDDED PERMANENT MAGNET, COMPRESSOR, AND REFRIGERATION/AIR-CONDITIONING DEVICE

(71) Applicant: Mitsubishi Electric Corporation, Tokyo (JP)

(72) Inventors: Kazuhiko Baba, Tokyo (JP); Masahiro Nigo, Tokyo (JP); Kazuchika Tsuchida, Tokyo (JP); Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/909,497

(22) PCT Filed: Sep. 25, 2013

(86) PCT No.: PCT/JP2013/075848
§ 371 (c)(1),
(2) Date: Feb. 2, 2016

(87) PCT Pub. No.: WO2015/045026
PCT Pub. Date: Apr. 2, 2015

(65) Prior Publication Data
US 2016/0172913 A1 Jun. 16, 2016

(51) Int. Cl.
*H02K 1/27* (2006.01)
*F25B 31/02* (2006.01)
(Continued)

(52) U.S. Cl.
CPC ........... *H02K 1/276* (2013.01); *F25B 31/026* (2013.01); *H02K 1/2766* (2013.01); *F04C 18/00* (2013.01);
(Continued)

(58) Field of Classification Search
CPC .. H02K 1/22; H02K 1/24; H02K 1/27; H02K 1/276; H02K 1/2766; H02K 21/14;
(Continued)

(56) References Cited

U.S. PATENT DOCUMENTS 4,658,165 A * 4/1987 Vanderschaeghe .. H02K 1/2773
310/156.57
7,932,658 B2 * 4/2011 Ionel ...................... H02K 1/276
310/156.33
(Continued)

FOREIGN PATENT DOCUMENTS

JP S58-105779 U 7/1983
JP 11-187597 A 7/1999
(Continued)

OTHER PUBLICATIONS

International Search Report of the International Searching Authority mailed Nov. 5, 2013 for the corresponding International application No. PCT/JP2013/075848 (and English translation).

*Primary Examiner* — Tran Nguyen
(74) *Attorney, Agent, or Firm* — Posz Law Group, PLC

(57) ABSTRACT

In an interior permanent magnet motor, at least one magnetic pole center slit and a plurality of side slits are formed between a rotor outer peripheral surface of a rotor and a radially-outer insertion hole contour surface of a magnet insertion hole. The plurality of side slits are formed so that at least one side slit is formed on each of both sides of the magnetic pole center slit in a width direction. The area of the magnetic pole center slit is smaller than the area of each of the plurality of side slits. A width of each of the plurality of side slits is larger than an interval between the adjacent slits.

6 Claims, 7 Drawing Sheets

(51) Int. Cl.
*F04C 18/00* (2006.01)
*F04C 29/00* (2006.01)

(52) U.S. Cl.
CPC ...... *F04C 29/0085* (2013.01); *F04C 2240/40* (2013.01)

(58) Field of Classification Search
CPC ........ F25B 31/02; F25B 31/026; F04C 18/00; F04C 29/00
See application file for complete search history.

(56) References Cited

U.S. PATENT DOCUMENTS

| | | | |
|---|---|---|---|
| 8,106,557 B2* | 1/2012 | Yoshino | H02K 1/276 310/156.53 |
| 2004/0150282 A1 | 8/2004 | Murakami et al. | |
| 2008/0224558 A1* | 9/2008 | Ionel | H02K 1/2766 310/156.57 |
| 2010/0117477 A1* | 5/2010 | Yoshino | H02K 1/276 310/156.53 |

FOREIGN PATENT DOCUMENTS

| | | | |
|---|---|---|---|
| JP | 2001-037186 A | | 2/2001 |
| JP | 2002-044920 A | | 2/2002 |
| JP | 2005245148 A | * | 9/2005 |
| JP | 2010068600 A | * | 3/2010 |
| JP | 2011078283 A | * | 4/2011 |
| JP | 2011083168 A | * | 4/2011 |
| JP | 2012-105410 A | | 5/2012 |
| JP | 2012105410 A | * | 5/2012 |
| JP | 2012-217249 A | | 11/2012 |

\* cited by examiner

ELECTRIC MOTOR WITH EMBEDDED PERMANENT MAGNET, COMPRESSOR, AND REFRIGERATION/AIR-CONDITIONING DEVICE

CROSS REFERENCE TO RELATED APPLICATION

This application is a U.S. national stage application of PCT/JP2013/075848 filed on Sep. 25, 2013, the contents of which are incorporated herein by reference.

TECHNICAL FIELD

The present invention relates to an interior permanent magnet motor, a compressor, and a refrigeration and air conditioning apparatus.

BACKGROUND

In recent years, along with an increase in awareness of energy saving, there have been proposed a large number of permanent magnet motors using rare-earth permanent magnets having high coercivity in a rotor to realize high efficiency. However, the rare-earth permanent magnets are expensive, thus leading to increase in cost of the motor. Therefore, in a rotor of a related-art general interior permanent magnet motor, sintered ferrite magnets are used instead of the rare-earth permanent magnets. When the sintered ferrite magnets are used instead of the rare-earth permanent magnets as described above, a residual flux density, which represents a magnitude of a magnetic force, is reduced to about ⅓. Therefore, the area of a surface of each of the permanent magnets is increased to the extent possible to compensate for lack of torque due to the reduction in magnetic force. Further, a plurality of magnet insertion holes, which are configured to embed the plurality of permanent magnets therein, are formed in a rotor core. In a core portion on a contour side with respect to each of those permanent magnets, slits extending in a radial direction are formed so as to reduce an electromagnetic exciting force generated in the motor.

For example, in Patent Literature 1, the following rotor of the interior permanent magnet motor is disclosed. The rotor of the interior permanent magnet motor includes a laminated core and a shaft. The laminated core includes a plurality of arc-shaped permanent magnets and a plurality of punched holes configured to receive the permanent magnets therein. Each of the plurality of punched holes is formed for one pole. Further, each of the plurality of punched holes is arranged so that the convex portion side of the arc is directed toward the rotor center.

Further, in the interior permanent magnet motor disclosed in Patent Literature 2, in order to increase the magnetic-path resistance against a reaction magnetic flux from a stator, in a portion of the core, which is located at an outer periphery of each of the permanent magnets, a plurality of elongated slits extending substantially in a normal direction are formed to be arrayed in a direction perpendicular to the normal. Further, when viewed substantially in a direction perpendicular to the normal, an interval between each of the slits and an outer peripheral surface of the rotor core and an interval between each of the slits and the permanent magnet are set smaller than an interval between the slits and an interval between magnetic pole pieces of adjacent teeth of the stator.

Further, in the rotor of the interior permanent magnet motor disclosed in Patent Literature 3, a plurality of slits are formed so as to greatly enlarge a region in a magnetic pole center portion, which is formed only by a magnetic portion without slits.

PATENT LITERATURE

[PTL 1] JP 58-105779 U (mainly FIG. 1)
[PTL 2] JP 2001-037186 A (mainly FIG. 1)
[PTL 3] JP 2012-217249 A (mainly FIG. 7)

In the interior permanent magnet motor disclosed in Patent Literature 1, each of the punched holes is arranged in such a manner that the convex portion side of the arc is directed toward the rotor center. Thus, the area of the surface of each of the permanent magnets can be increased to increase torque. However, when a shaft of the rotor is eccentrically assembled due to a factor of fluctuation in assembly or the like, there may arise a problem in that a magnetic flux generated by a current flowing through a coil of the stator attracts the rotor core so that the electromagnetic exciting force in the radial direction is increased, thus leading to increase in vibration and noise.

Further, the interior permanent magnet motor disclosed in Patent Literature 2 has structure in which the plurality of elongated slits are arrayed in the portion of the rotor core on the radially outer side with respect to each of the permanent magnets. Therefore, when the shaft of the rotor is eccentrically assembled due to the factor of fluctuation in assembly or the like, there may arise a problem in that an effect of reducing the electromagnetic exciting force in the radial direction is small, thus leading to the increase in vibration and noise.

Further, in the interior permanent magnet motor disclosed in Patent Literature 3, the region formed only by the magnetic portion is greatly enlarged in the magnetic pole center portion of the rotor core. Therefore, when the shaft of the rotor is eccentrically assembled due to the factor of fluctuation in assembly or the like, there may arise a problem in that the effect of reducing the electromagnetic exciting force in the radial direction is small, thus leading to the increase in vibration and noise.

SUMMARY

The present invention has been made in view of the above, and has an object to provide an interior permanent magnet motor capable of suppressing vibration and noise that may be caused by the magnetic attraction force in the radial direction, which is generated due to fluctuation in assembly.

In order to achieve the object described above, according to one embodiment of the present invention, there is provided an interior permanent magnet motor, including: a stator; and a rotor rotatably arranged so as to be opposed to the stator, in which the rotor includes a rotor core having a plurality of magnet insertion holes formed therein, into which corresponding permanent magnets are respectively inserted, in which the plurality of permanent magnets and the plurality of magnet insertion holes are each formed into an arc shape that is convex toward a center side of the rotor, in which at least one magnetic pole center slit and a plurality of side slits are formed between a rotor outer peripheral surface of the rotor and the radially-outer insertion hole contour surface of each of the magnet insertion holes, in which the magnetic pole center slit is arranged at a corresponding magnetic pole center, in which the plurality of side slits are formed so that at least one side slit is formed on each of both sides of the magnetic pole center slit in a width direction, in which an area of the magnetic pole center slit is smaller than an area of each of the side slits, and in which a width of each of the plurality of side slits is larger than an interval between the magnetic pole center slit and the side slit that are adjacent to each other, and is larger than an interval between the side slits that are adjacent to each other.

A width of the magnetic pole center slit may be set smaller than a width of the each of the side slits.

A length of the each of the plurality of side slits may be set larger than a length of the magnetic pole center slit.

It is preferred that the permanent magnets be ferrite magnets.

Further, in order to achieve the same object, according to one embodiment of the present invention, there is also provided a compressor. The compressor of the one embodiment of the present invention includes, in an airtight container: a motor; and a compression element. The motor is the above-mentioned interior permanent magnet motor of the one embodiment of the present invention.

Further, in order to achieve the same object, according to one embodiment of the present invention, there is also provided a refrigeration and air conditioning apparatus. The refrigeration and air conditioning apparatus of the one embodiment of the present invention includes the above-mentioned compressor of the one embodiment of the present invention as a component of a refrigeration cycle.

According to the one embodiment of the present invention, it is possible to suppress vibration and noise that may be caused by a magnetic attraction force in the radial direction, which is generated due to fluctuation in assembly.

DETAILED DESCRIPTION

Figure 1:
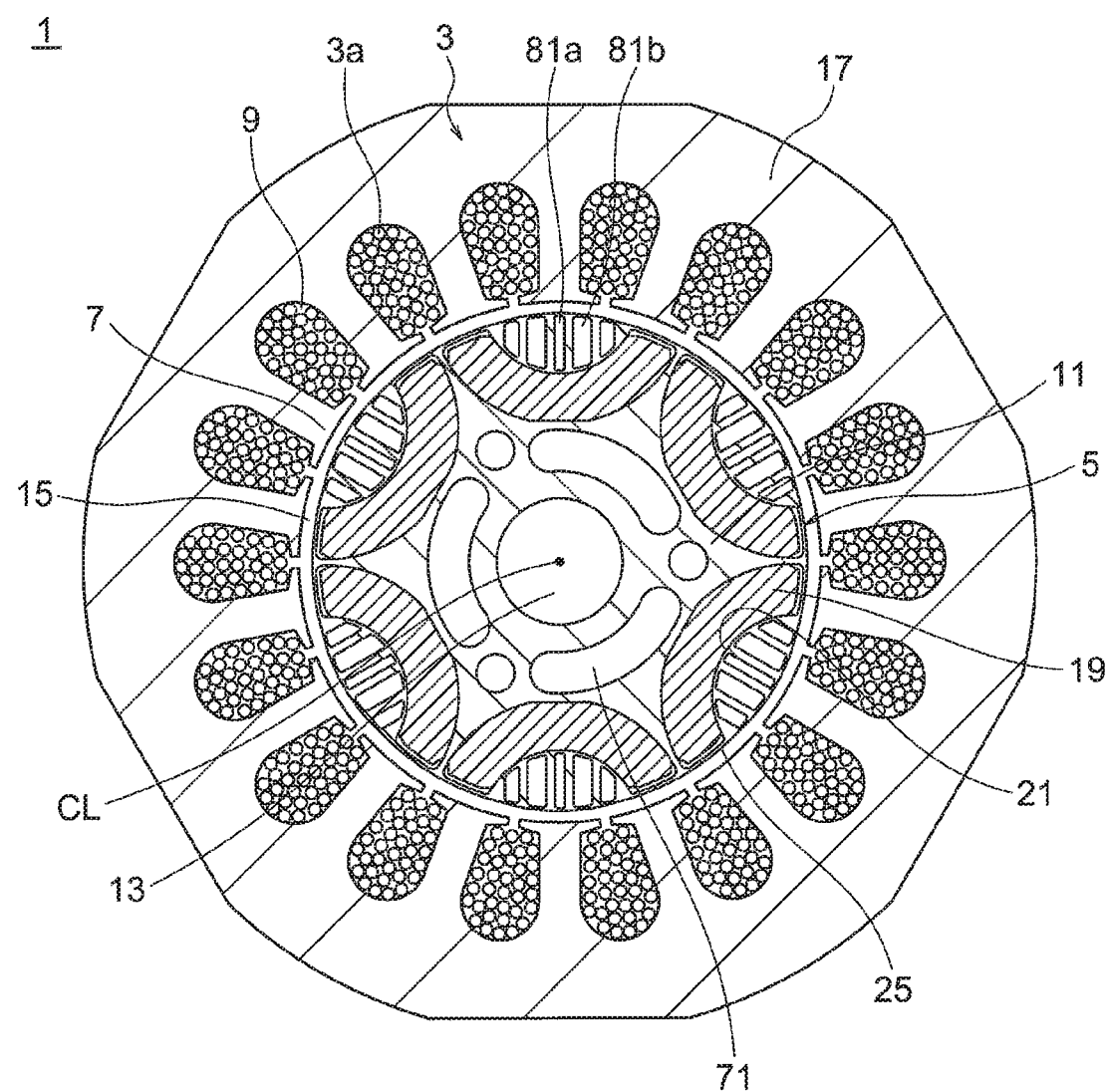
FIG. 1 is a view for illustrating a cross-section orthogonal to a rotation center line of an interior permanent magnet motor according to a first embodiment of the present invention.

Now, embodiments of the present invention are described referring to the accompanying drawings. Note that, in the drawings, the same reference symbols represent the same or corresponding parts. Note that, FIG. 2 to FIG. 6 are all partially enlarged views extracting a part from an entire configuration in the illustration of FIG. 1, and for the sake of clarity of illustration, the hatching is omitted.

First Embodiment

Figure 2:
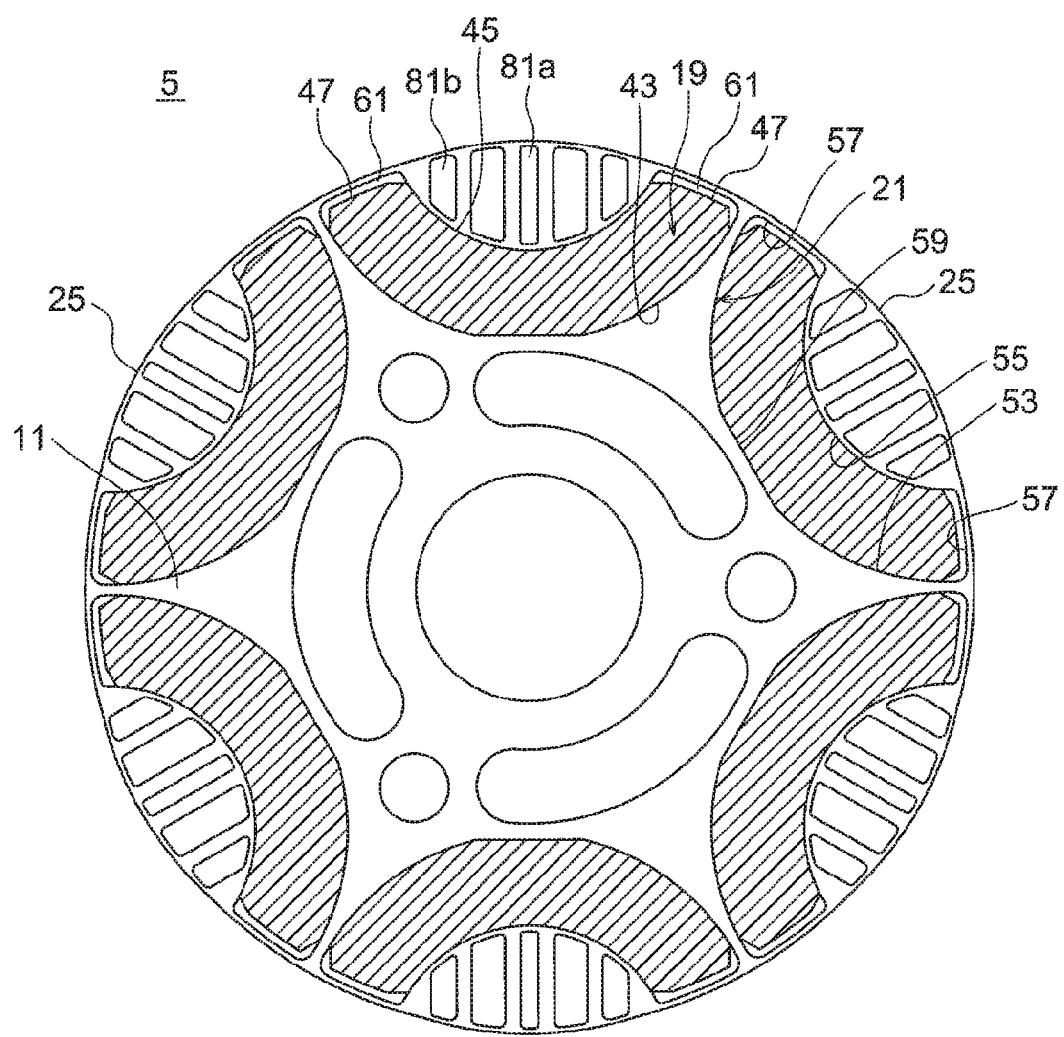
FIG. 2 is a view for illustrating a rotor alone in FIG. 1 in an enlarged manner.
Figure 3:
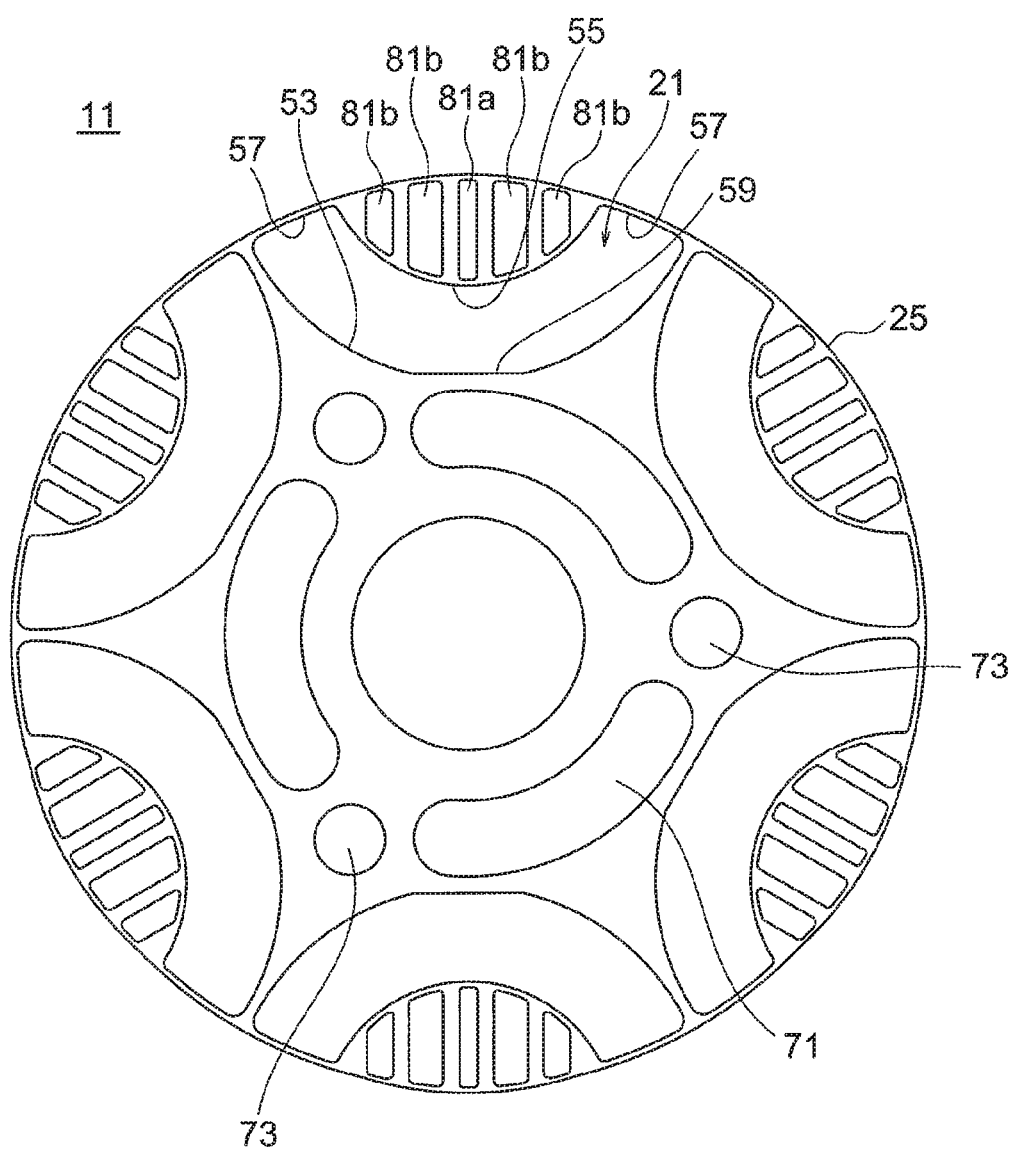
FIG. 3 is a sectional view for illustrating a state in which permanent magnets are not set in magnet insertion holes in FIG. 2.
Figure 4:
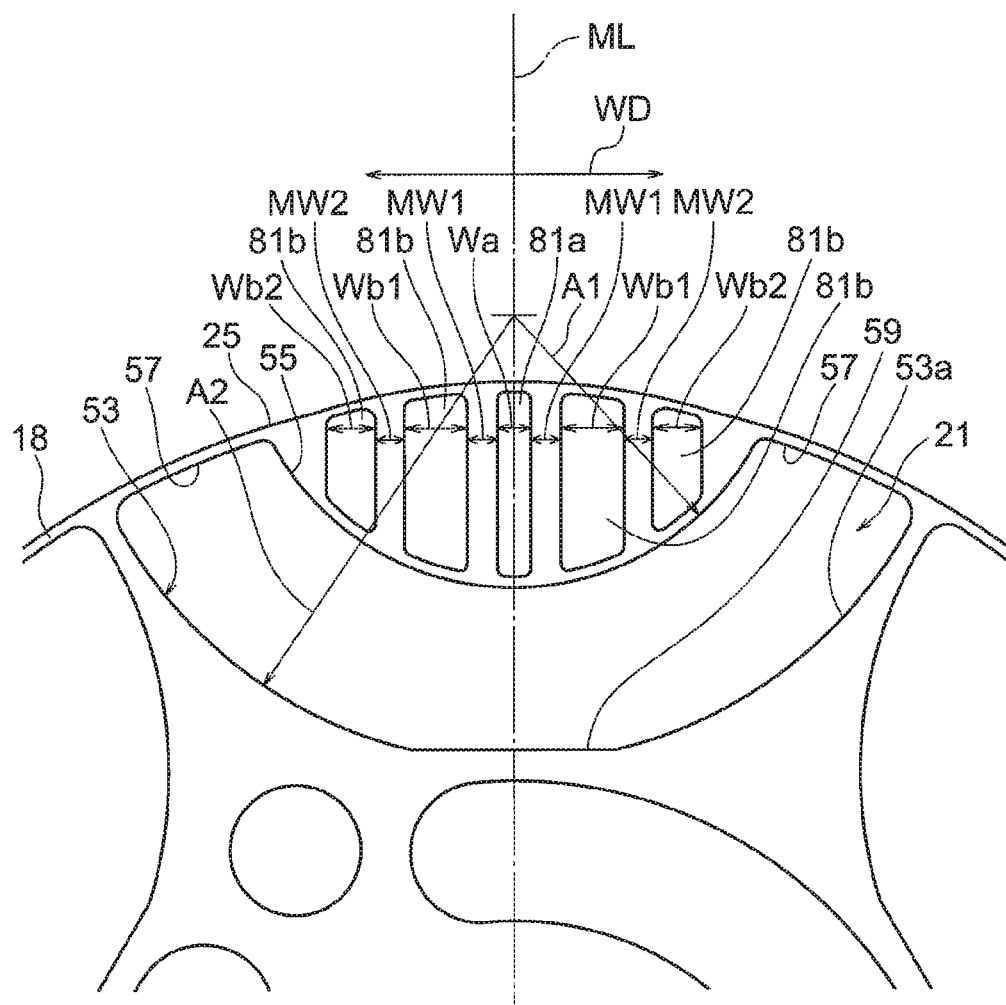
FIG. 4 is a view for illustrating a peripheral part of one magnet insertion hole in FIG. 2 in an enlarged manner.

FIG. 1 is a view for illustrating a cross-section orthogonal to a rotation center line of an interior permanent magnet motor according to a first embodiment of the present invention. FIG. 2 is a view for illustrating a rotor alone in FIG. 1 in an enlarged manner. FIG. 3 is a sectional view for illustrating a state in which permanent magnets are not set in magnet insertion holes in FIG. 2. FIG. 4 is a view for illustrating a peripheral part of one magnet insertion hole in FIG. 2 in an enlarged manner.

An interior permanent magnet motor 1 includes a stator 3 and a rotor 5 rotatably arranged so as to be opposed to the stator. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A stator winding 3a is wound around each of the plurality of tooth portions 7 by, for example, a distributed winding method. Note that, the present invention is not limited thereto, and a stator including windings of a concentrated winding method may be used.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor 5 and an inner peripheral surface of the stator 3.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5.

Next, configurations of the stator 3 and the rotor 5 are described in detail. The stator 3 includes a stator core 17. The stator core 17 is formed by punching magnetic steel plates into a predetermined shape, and laminating a predetermined number of the magnetic steel plates while fastening the magnetic steel plates by caulking.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by punching magnetic steel plates into a predetermined shape, and laminating a predetermined number of the magnetic steel plates while fastening the magnetic steel plates by caulking. Inter-pole thin portions 18 having a uniform thickness are each secured between a rotor outer peripheral surface 25 and a side-end insertion hole contour surface 57 described later. Those inter-pole thin portions 18 each serve as a path for a leakage magnetic flux between the adjacent magnetic poles, and hence it is preferred that the inter-pole thin portion 18 have a thickness as small as possible.

A plurality of permanent magnets 19, which are magnetized so that the N poles and the S poles are alternately positioned, are arranged in the rotor core 11. Referring to FIG. 1, each of the permanent magnets 19 is formed of a sintered ferrite magnet, curved into an arc shape, and arranged so that a convex portion side of the arc shape faces the center side of the rotor 5. In more detail, magnet insertion holes 21 as many as the number of the plurality of permanent magnets 19 are formed in the rotor core 11. The corresponding permanent magnets 19 are inserted into a plurality of the magnet insertion holes 21, respectively. That is, the plurality of permanent magnets 19 and the plurality of magnet insertion holes 21 are each formed into an arc shape that is convex toward the center side of the rotor 5. Further, as illustrated in FIG. 1, one permanent magnet 19 is inserted into one magnet insertion hole 21. Note that, the number of magnetic poles of the rotor 5 may be any number as long as the number is two or more.

Next, details of the permanent magnets and the magnet insertion holes are described. The permanent magnets 19 each have a radially-inner magnet contour surface 43, a radially-outer magnet contour surface 45, and a pair of side-end magnet contour surfaces 47. Further, the magnet insertion holes 21 each have a radially-inner insertion hole contour surface 53, a radially-outer insertion hole contour surface 55, and a pair of side-end insertion hole contour surfaces 57. The radially-outer insertion hole contour surface 55 is formed by a first arc surface having a first arc radius A1. On the other hand, the radially-inner insertion hole contour surface 53 is formed by a straight surface 59 and a second arc surface 53a having a second arc radius A2.

The first arc radius A1 and the second arc radius A2 have a common radius center, and the common radius center is located on the radially outer side with respect to the magnet insertion hole 21 and on a corresponding magnetic pole center line ML. In other words, the radially-inner insertion hole contour surface 53 and the radially-outer insertion hole contour surface 55 are formed concentrically. The center of the first arc surface and the center of the second arc surface coincide with an orientation center (orientation focal point) of the permanent magnet.

When viewed in the cross-section having the rotation center line CL of the rotor 5 as the normal as in FIG. 4, the straight surface 59 extends along a virtual base plane orthogonal to the magnetic pole center line ML. That is, the straight surface 59 is formed in a direction orthogonal to the corresponding magnetic pole center line ML.

As illustrated in FIG. 2, under a state in which the permanent magnet 19 is inserted into the corresponding magnet insertion hole 21, air gap portions 61 are formed each between the side-end magnet contour surface 47 and the side-end insertion hole contour surface 57. Further, the radially-outer magnet contour surface 45 and the radially-outer insertion hole contour surface 55 are held in contact with each other, and the radially-inner magnet contour surface 43 and the radially-inner insertion hole contour surface 53 are held in contact with each other. Further, when viewed in the cross-section having the rotation center line CL of the rotor 5 as the normal, the permanent magnet 19 and the magnet insertion hole 21 are each formed to be line symmetric across the corresponding magnetic pole center line ML.

On a radially inner side of the rotor core 11 with respect to the magnet insertion holes 21, in particular, on a radially inner side of the rotor core 11 with respect to the straight surfaces 59, there is formed at least one air hole (plurality of air holes 71 in the illustrated example) configured to allow a refrigerant and an oil to pass therethrough when the interior permanent magnet motor is mounted on a compressor. Note that, reference symbol 73 denotes a rivet hole. The air holes 71 and the rivet holes 73 are alternately arrayed in the circumferential direction, and the air holes 71 and the rivet holes 73 are arrayed equiangularly. Each of the air holes 71 and the rivet holes 73 is positioned in a corresponding inter-pole portion.

In the illustrated example, three air holes 71 are arc-shaped elongated holes that are convex toward the radially-inner insertion hole contour surfaces 53 of the magnet insertion holes 21. The three air holes 71 are arranged on the same circumference about the rotor center so as to be separated equiangularly. Each of the elongated holes is arranged across radially inner parts of corresponding two magnet insertion holes 21 to attain a configuration in which the air hole 71 is positioned on the radially inner side (on the magnetic pole center line) with respect to the straight surface 59 of each of all the magnet insertion holes 21 (that is, a straight surface of each of the permanent magnets 19, which corresponds to the straight surface 59).

At least one magnetic pole center slit and a plurality of side slits are formed between the rotor outer peripheral surface 25 of the rotor 5 and the radially-outer insertion hole contour surface 55 of each of the magnet insertion holes 21. The magnetic pole center slit is arranged at a corresponding magnetic pole center, and the plurality of side slits are formed so that at least one side slit is formed on each of both sides of the magnetic pole center slit in a width direction. As a specific example, in the first embodiment, one magnetic pole center slit 81a is arranged on the corresponding magnetic pole center line ML, and two side slits 81b are formed on one side of the magnetic pole center slit in the width direction, specifically, a total of four side slits 81b are formed. Note that, regarding the width direction, for each magnetic pole corresponding to a component part of an object, a direction orthogonal to the corresponding magnetic pole center line ML is defined as a width direction WD. The one magnetic pole center slit 81a and the four side slits 81b all extend in a direction parallel to the corresponding magnetic pole center line ML (lengthwise direction). The one magnetic pole center slit 81a and the four side slits 81b are formed to be line symmetric across the corresponding magnetic pole center line ML.

When viewed in the cross-section having the rotation center line CL of the rotor 5 as the normal, the area of the magnetic pole center slit 81a is smaller than the area of each of the four side slits 81b.

Further, intervals between end portions of the respective side slits 81b in the lengthwise direction and the rotor outer peripheral surface 25 or the radially-outer insertion hole contour surface 55 are set to be approximately equal among the four side slits 81b. Further, an interval between the rotor outer peripheral surface 25 and the radially-outer insertion hole contour surface 55 is reduced as being away from the magnetic pole center line ML in the width direction. Therefore, regarding lengths of the four side slits 81b, as a relative relationship, the side slits 81b closer to the magnetic pole center line ML are formed longer than the side slits 81b farther from the magnetic pole center line ML. Further, regarding widths of the four side slits 81b, as a relative relationship, widths Wb1 of the side slits 81b closer to the magnetic pole center line ML are larger than widths Wb2 of the side slits 81b farther from the magnetic pole center line ML.

A width Wa of the magnetic pole center slit 81a is smaller than each of the widths Wb1 and Wb2 of the side slits 81b. Further, assuming that an interval between the adjacent magnetic pole center slit 81a and side slit 81b (magnetic-path width) is represented by MW1, and an interval between the adjacent side slits 81b (magnetic-path width) is represented by MW2, each of the widths Wb1 and Wb2 of the side slits 81b is larger than the interval MW1 between the adjacent magnetic pole center slit 81a and side slit 81b, and is larger than the interval MW2 between the adjacent side slits 81b.

Next, advantages of the interior permanent magnet motor according to the first embodiment, which is constructed as described above, are described. In the rotor in which the arc-shaped permanent magnets are arranged in the rotor core so that the convex portion sides face the center side of the rotor, the surface of each magnet is curved into an arc shape. Thus, the area of the surface of each magnet can be increased to increase the amount of the magnetic flux generated from the permanent magnets. Thus, the current to be applied to the motor can be reduced, thereby being capable of attaining the highly efficient motor or reducing the volume of the motor. In particular, when the ferrite magnets are used as the permanent magnets to be embedded in the rotor, cost can be reduced as compared to the case of rare-earth magnets. On the other hand, there is a problem in that a residual magnetic flux density may be reduced to cause lack of torque. In view of this problem, as described above, the arc-shaped permanent magnets are arranged in the rotor core so that the convex portion sides face the center side of the rotor. Thus, the area of the surface of each magnet can be secured, and the lack of torque can also be avoided while reducing the cost. Further, in the rotor, the arc-shaped permanent magnets are arranged so that the convex portion sides face the center side of the rotor. Thus, the lack of torque can be avoided. However, when the shaft of the rotor is eccentrically assembled into the stator due to a factor of fluctuation in assembly or the like, there may arise a problem in that the magnetic flux generated by a current flowing through the coil of the stator attracts the rotor core so that the electromagnetic exciting force in the radial direction is increased, thus leading to increase in vibration and noise. In view of this problem, in the first embodiment, the slit is formed not only at the portion separated away from the magnetic pole center, but also in the vicinity of the magnetic pole center. The width of each of the plurality of side slits is set larger than the magnetic-path width between the adjacent slits. Thus, the above-mentioned increase in the electromagnetic exciting force can be suppressed. Further, while the slit is formed also in the vicinity of the magnetic pole center, the area of the magnetic pole center slit is set smaller than the area of each of the side slits. Thus, a magnetic flux density distribution on the rotor surface can be set as a distribution similar to a sine wave having the highest magnetic flux density at the magnetic pole center portion. Accordingly, a harmonic component of the magnetic flux density can be reduced to reduce vibration and noise of the motor. In this manner, vibration and noise that may be caused by the magnetic attraction force in the radial direction, which is generated due to the fluctuation in assembly, can be suppressed while using the arc-shaped permanent magnets that are convex toward the center side of the rotor.

Second Embodiment

Figure 5:
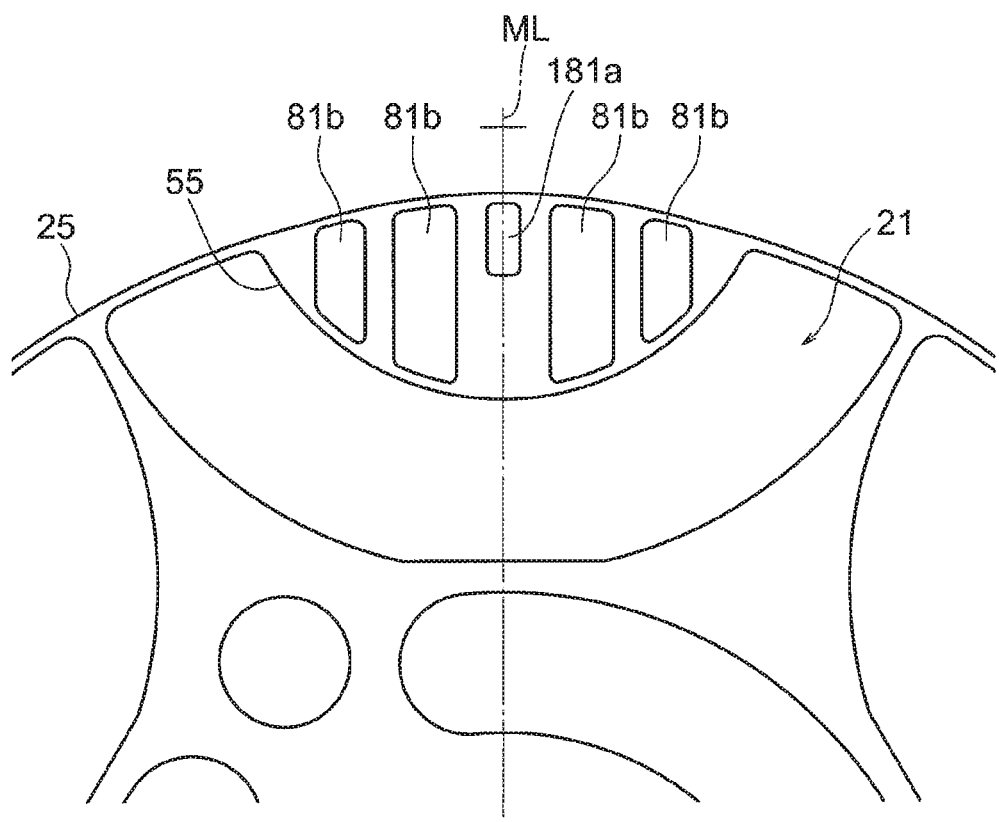
FIG. 5 is a view according to a second embodiment of the present invention in the same manner as that of FIG. 4.

Next, an interior permanent magnet motor according to a second embodiment of the present invention is described. FIG. 5 is a view according to the second embodiment of the present invention in the same manner as that of FIG. 4. Note that, the second embodiment has the same configuration as that of the above-mentioned first embodiment except for portions described below.

The second embodiment corresponds to a mode in which the magnetic pole center slit is formed shorter than each of the side slits in the above-mentioned first embodiment. In other words, in the second embodiment, the length of each of the four side slits 81*b* is larger than a length of a magnetic pole center slit 181*a*. Further, the magnetic pole center slit 181*a* is arranged closer to the rotor outer peripheral surface 25, and is formed closer to the rotor outer peripheral surface 25 than the radially-outer insertion hole contour surface 55.

Also in this mode, vibration and noise that may be caused by the magnetic attraction force in the radial direction, which is generated due to the fluctuation in assembly, can be suppressed while using the arc-shaped permanent magnets that are convex toward the center side of the rotor.

Third Embodiment

Figure 6:
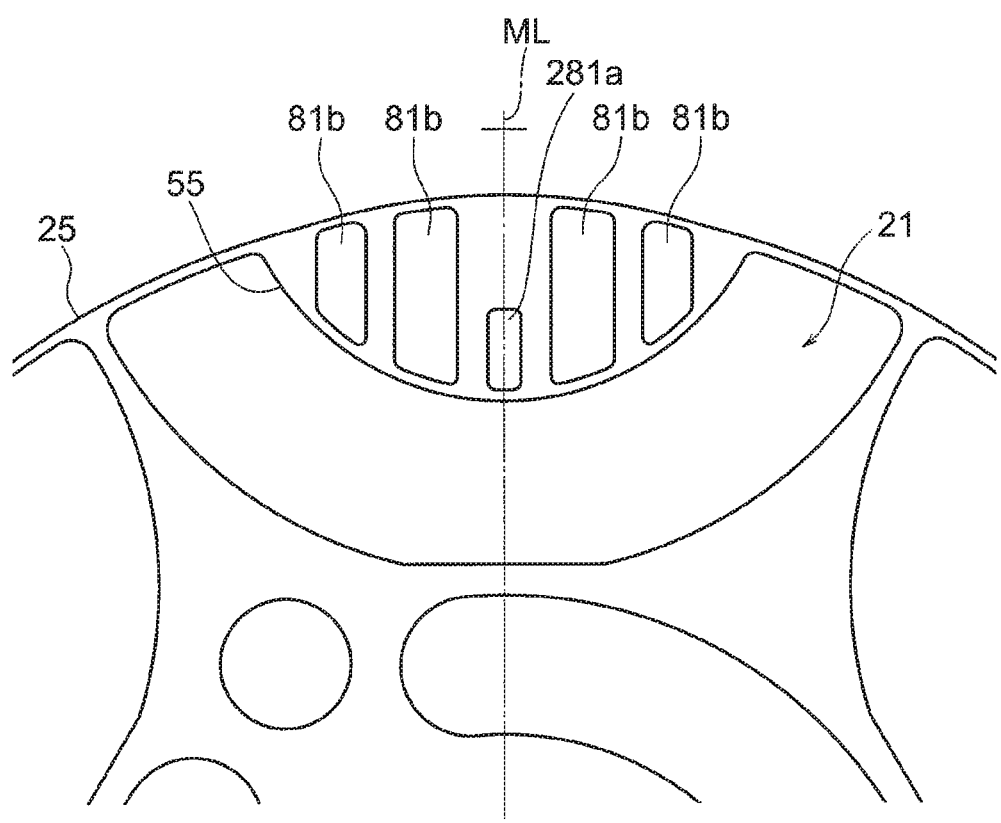
FIG. 6 is a view according to a third embodiment of the present invention in the same manner as that of FIG. 4.

Next, an interior permanent magnet motor according to a third embodiment of the present invention is described. FIG. 6 is a view according to the third embodiment of the present invention in the same manner as that of FIG. 4. Note that, the third embodiment has the same configuration as that of the above-mentioned first embodiment except for portions described below.

The third embodiment also corresponds to a mode in which the magnetic pole center slit is formed shorter than each of the side slits in the above-mentioned first embodiment. The length of each of the four side slits 81*b* is larger than a length of a magnetic pole center slit 281*a*. Further, the magnetic pole center slit 281*a* is arranged closer to the radially-outer insertion hole contour surface 55, and is formed closer to the radially-outer insertion hole contour surface 55 than the rotor outer peripheral surface 25.

Also in this mode, vibration and noise that may be caused by the magnetic attraction force in the radial direction, which is generated due to the fluctuation in assembly, can be suppressed while using the arc-shaped permanent magnets that are convex toward the center side of the rotor.

Fourth Embodiment

Next, as a fourth embodiment of the present invention, there is described a rotary compressor having the interior permanent magnet motor according to any one of the above-mentioned first to third embodiments mounted therein. Note that, the present invention encompasses a compressor having the interior permanent magnet motor according to any one of the above-mentioned first to third embodiments mounted therein. However, the type of the compressor is not limited to the rotary compressor.

Figure 7:
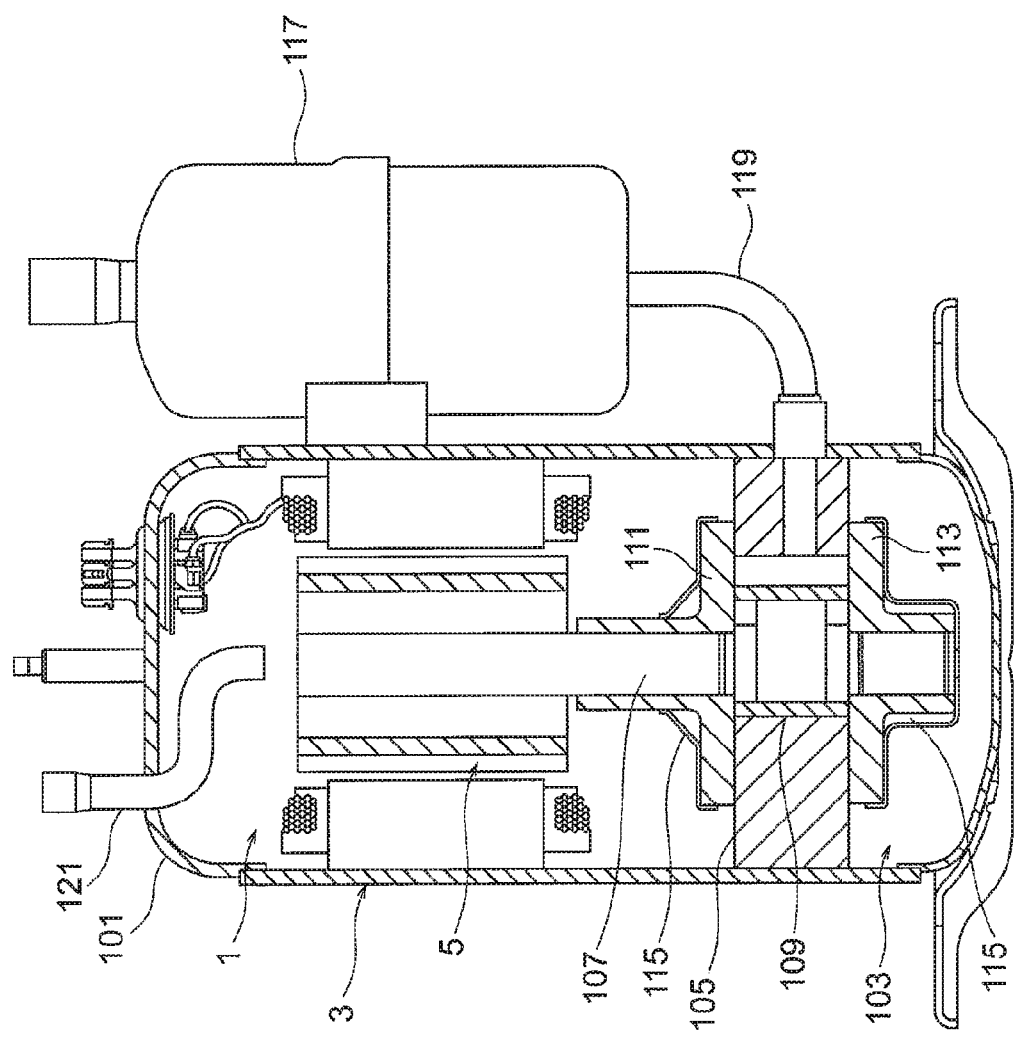
FIG. 7 is a vertical sectional view of a rotary compressor having the interior permanent magnet motor mounted therein according to a fourth embodiment of the present invention.

FIG. 7 is a vertical sectional view of the rotary compressor having the interior permanent magnet motor mounted therein. A rotary compressor 100 includes the interior permanent magnet motor 1 (motor element) and a compression element 103 in an airtight container 101. Although not illustrated, a refrigerating machine oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as a shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion and which are configured to close axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. The coil of the stator 3 is supplied with power from a glass terminal fixed to the airtight container 101.

The rotor 5 is arranged through intermediation of an air gap on the radially inner side of the stator 3, and is held in a rotatable state by the bearing portions (upper frame 111 and lower frame 113) of the compression element 103 via the rotary shaft 107 (shaft 13) in the center portion of the rotor 5.

Next, an operation of the rotary compressor 100 is described. A refrigerant gas supplied from an accumulator 117 is taken into the cylinder 105 through an intake pipe 119 fixed to the airtight container 101. The interior permanent magnet motor 1 is rotated by energization of an inverter so that the piston 109 fitted to the rotary shaft 107 is rotated in the cylinder 105. With this, the refrigerant is compressed in the cylinder 105. The refrigerant, which has passed through the muffler 115, rises in the airtight container 101. At this time, the refrigerating machine oil is mixed into the compressed refrigerant. When the mixture of the refrigerant and the refrigerating machine oil passes through the air holes 71 formed in the rotor core 11, the refrigerant and the refrigerating machine oil are promoted to be separated from each other, and hence the refrigerating machine oil can be prevented from flowing into a discharge pipe 121. In this manner, the compressed refrigerant is supplied on a high-pressure side of the refrigeration cycle through the discharge pipe 121 arranged on the airtight container 101.

Note that, as the refrigerant for the rotary compressor 100, R410A, R407C, R22, or the like that has hitherto been used may be used, but any refrigerant such as a refrigerant having a low global warming potential (GWP) can also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf ($CF_3CF=CH_2$) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Also in the rotary compressor according to the fourth embodiment, which is constructed as described above, advantages similar to the advantages of any one of the corresponding first to third embodiments described above are obtained.

Fifth Embodiment

Further, the present invention may be carried out as a refrigeration and air conditioning apparatus including the compressor according to the above-mentioned fourth embodiment as a component of a refrigeration cycle. Note that, configurations of components other than the compressor of the refrigeration cycle of the refrigeration and air conditioning apparatus are not particularly limited.

In the above, the details of the present invention are specifically described referring to the preferred embodiments. However, it is apparent to those skilled in the art that various modifications may be made based on the basic technical concept and the teachings of the present invention.

The invention claimed is:

1. An interior permanent magnet motor, comprising:
a stator; and
a rotor rotatably arranged so as to be opposed to the stator,
wherein the rotor comprises a rotor core having a plurality of magnet insertion holes formed therein, into which corresponding permanent magnets are respectively inserted,
wherein at least one magnetic pole center slit and a plurality of side slits are formed between a rotor outer peripheral surface of the rotor and a radially-outer insertion hole contour surface of each of the magnet insertion holes,
wherein the magnetic pole center slit is arranged at a corresponding magnetic pole center,
wherein the plurality of side slits are formed so that at least one side slit is formed on each of both sides of the magnetic pole center slit in a width direction,
wherein an area of the magnetic pole center slit is smaller than an area of each of the side slits, and
wherein a width of each of the plurality of side slits is larger than an interval between the magnetic pole center slit and the side slit that are adjacent to each other, and is larger than an interval between the side slits that are adjacent to each other.

2. An interior permanent magnet motor according to claim 1, wherein a width of the magnetic pole center slit is smaller than a width of the each of the side slits.

3. An interior permanent magnet motor according to claim 1, wherein a length of the each of the plurality of side slits is larger than a length of the magnetic pole center slit.

4. An interior permanent magnet motor according to claim 1, wherein the plurality of permanent magnets and the plurality of magnet insertion holes are each formed into an arc shape that is convex toward a center side of the rotor.

5. A compressor, comprising, in an airtight container:
a motor; and
a compression element,
wherein the motor comprises the interior permanent magnet motor of claim 1.

6. A refrigeration and air conditioning apparatus, comprising the compressor of claim 5 as a component of a refrigeration cycle.

* * * * *